Jan. 13, 1953 J. W. SNYDER 2,625,148
PORTABLE GRILL
Filed Dec. 5, 1949 2 SHEETS—SHEET 1
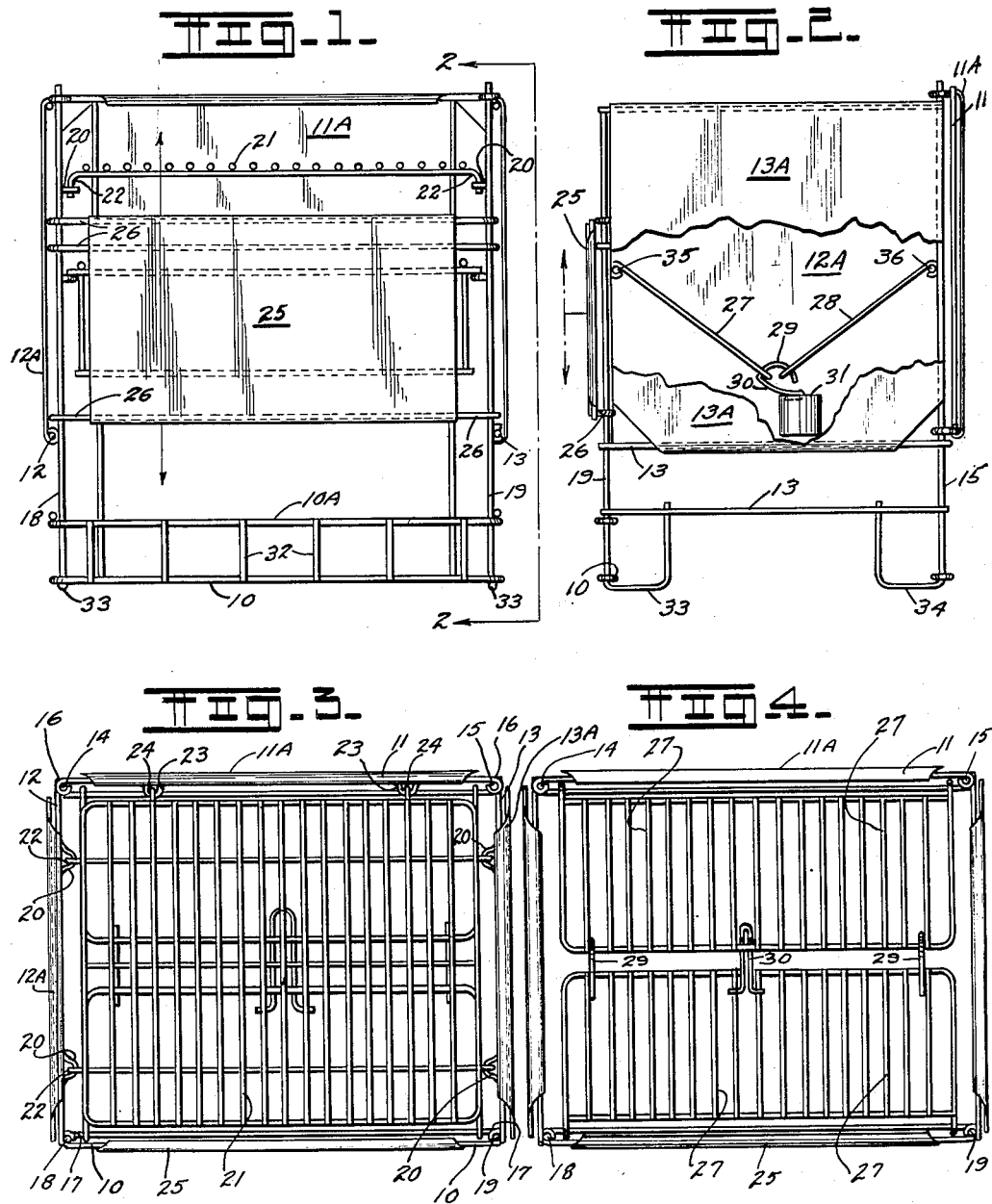
INVENTOR.
John W. Snyder.
BY W. B. Harpman
ATTORNEY.

Jan. 13, 1953   J. W. SNYDER   2,625,148
PORTABLE GRILL
Filed Dec. 5, 1949   2 SHEETS—SHEET 2
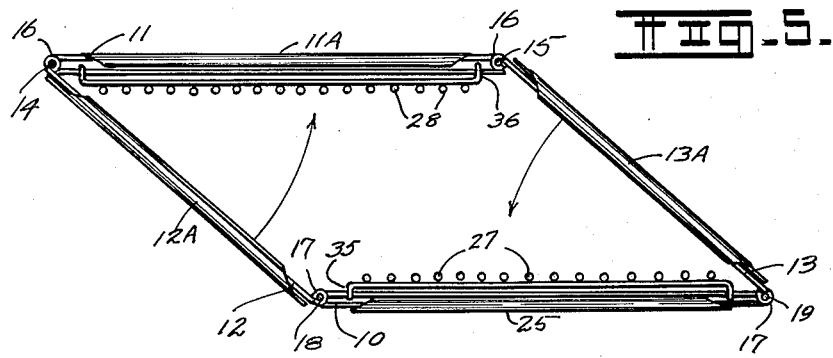
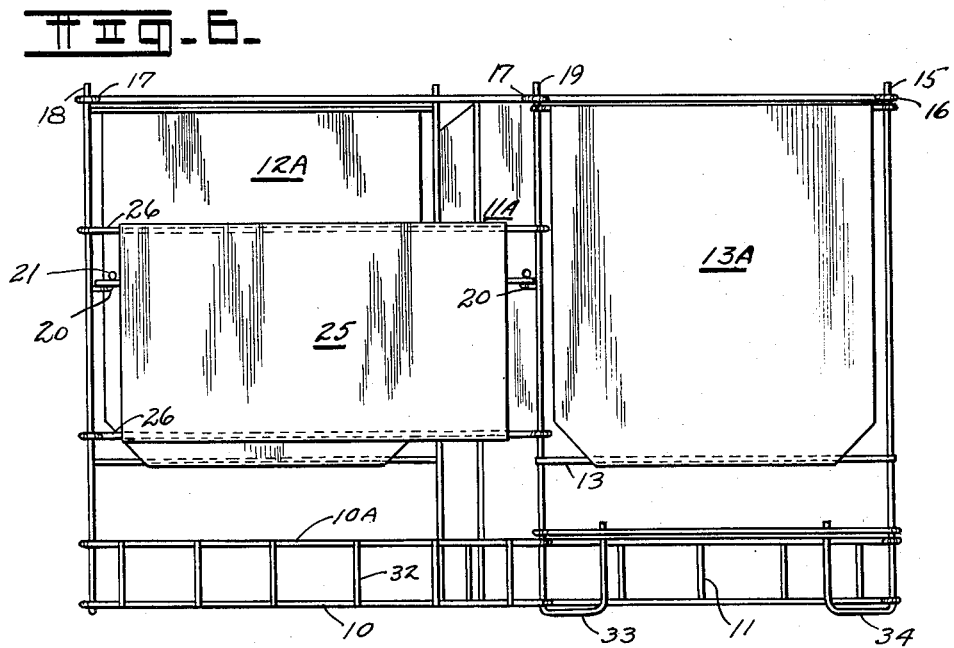
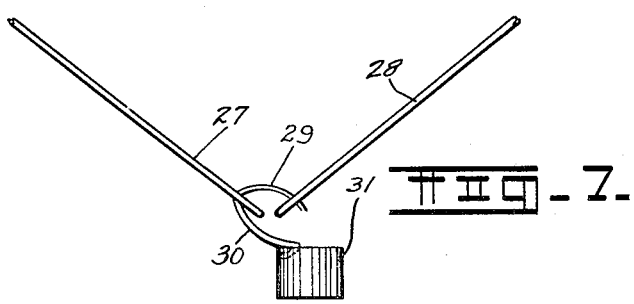
INVENTOR.
John W. Snyder.
BY
ATTORNEY.

Patented Jan. 13, 1953

2,625,148

UNITED STATES PATENT OFFICE 2,625,148

PORTABLE GRILL

John W. Snyder, Youngstown, Ohio

Application December 5, 1949, Serial No. 131,134

2 Claims. (Cl. 126—25)

This invention relates to a grill and more particularly to a portable grill providing a convenient outdoor cooking device.

The principal object of the invention is the provision of a portable grill for outdoor cooking purposes.

A further object of the invention is the provision of a portable grill of a collapsible nature and formed essentially of wire sections for lightweight and easy handling.

A still further object of the invention is the provision of a portable grill having novel grates for holding combustible material.

A still further object of the invention is the provision of a portable grill having a combination adjustable draft and splatter shield incorporated therein.

A still further object of the invention is the provision of a portable grill, the usable surface portion of which may be adjusted toward or away from the heat source therein.

The portable grill disclosed herein comprises a simple and efficient lightweight structure formed essentially of wire framework panels pivotally secured to one another and adapted to be opened into square shape to enclose grates and a grill surface. The device is particularly adapted for picnic cooking and camping trips and the like in which a compact portable grill unit is indicated and which device may be set up to form a relatively large grill of convenient height for outdoor cooking purposes.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a front view of the portable grill.

Figure 2 is a side view thereof with parts broken away taken on line 2—2 of Figure 1.

Figure 3 is a top plan view showing the cooking grill surface in position.

Figure 4 is a top plan view with the cooking grill removed and showing the grates in position.

Figure 5 is a top plan view showing the grates collapsed and the portable grill partially collapsed.

Figure 6 is a front view showing the portable grate completely collapsed.

Figure 7 is an enlarged detail of portions of the grates and means for holding a can of ignition fuel therebeneath.

By referring to the drawings and Figures 1, 2, 3 and 4 in particular it will be seen that the portable grill comprises a front wire frame 10, a back wire frame 11 and a pair of oppositely disposed side wire frames 12 and 13. The wire frames 12 and 13 have end rear corner posts 14 and 15, respectively, which are encircled by loops 16 formed on the rear frame 11. The front section 10 has sidewardly extending loops 17—17 which are engaged about vertical corner posts 18 and 19 formed on the side frames 12 and 13, respectively. Thus, the frame sections 10, 11, 12 and 13 are secured one to another in pivotal relationship so that the frames will form a square or rectangle when viewed in top plan view, as shown in Figures 3 and 4 of the drawings. The pivotal connection of the frame sections 10, 11, 12 and 13 enables them to be collapsed against one another as shown in Figures 5 and 6 of the drawings.

Each of the side frames 12 and 13 has a plurality of inturned loops 20—20, oppositely disposed pairs of which are arranged on several horizontal planes so that a grill 21 having sidewardly extending downturned hooks 22 may be supported thereby, as best shown in Figures 1 and 3 of the drawings. The back panel 11 also has inturned loops 23 and rearwardly projecting hooks 24 on the grill 21 engage the same to support the rear surface of the grill 21.

The back frame 11 has a sheet metal panel 11A secured thereto as by having the edges thereof rolled around the edge frame sections thereof. Each of the side panels 12 and 13 has a sheet metal panel 12A and 13A positioned thereon in the same manner. The front frame 10 has a sheet metal panel 25 secured to transversely positioned rods 26, the ends of which extend beyond the ends of the sheet metal panel 25 and are looped about the corner posts 18 and 19 of the side frames 12 and 13. The sheet metal panel 25 is, therefore, movable vertically, as shown in Figure 1 of the drawings, and forms a combination draft and splatter shield. When in lowermost position, as shown in Figures 1 and 2 of the drawings, the sheet metal panel 25 forms a draft shield with respect to combustible material positioned in a pair of grates 27 and 28 which are pivoted to the front and back panels 10 and 11, respectively, and temporarily secured to one another adjacent their lowermost ends by means of a plurality of hooks 29 so as to form a V-shaped grate, as best shown in Figures 2 and 4 of the drawings.

It will be observed that when the grill is in opened position the grates 27 and 28 are temporarily hooked to one another by the hooks 29 and it will also be observed that the hooks 29 engage over the lower edge of the grate 28 so that by merely lifting the grate 27 which carries the hooks 29, the grate 27 will fall by gravity and thereby drop any combustible material that may be located thereon. The grates 27 and 28 and the grill 21 serve to hold the four wire frames 10, 11, 12 and 13 in substantially square or rectangular position when viewed in top plan view and thereby prevent the device from collapsing when in use. It will be observed that the sheet metal panel 25 may be moved upwardly, as shown in Figures 1 and 2 of the drawings so that it provides a splatter shield with respect to the grill 21 when the same is located in one of the optional lower positions. When the grill 21 is positioned on the upper edges of the frames 12, 13 and 11 the splatter shield then acts only as a draft deflector and control.

In order that combustible material positioned on the grates 27 and 28, when they are held in engaged relationship, as shown in Figures 2, 4 and 7 of the drawings, may be ignited a projecting wire clip 30, as best shown in Figure 7 of the drawings, is formed on or as part of the grate 27 and extends outwardly and downwardly therefrom and has an inturned end 31 adapted to hook under the lip of a can of solidified alcohol or the like which can be positioned thereon immediately below the grate 28 and ignited to initiate combustion of the combustible material such as charcoal on the grates 27 and 28.

By referring again to Figures 1 and 6 of the drawings it will be noted that the lowermost portion of the front wire frame 10 is reinforced with an extra transverse section 10A and a plurality of vertically standing bracing members 32. The lowermost ends of the corner posts 18 and 19 are turned backwardly and then forwardly, as best shown in Figure 2 of the drawings, to form relatively broad flat leg surfaces 33 while the corner posts 14 and 15 have their lowermost ends turned forwardly and upwardly to form relatively broad flat leg surfaces 34. The same construction is found in the formation of the back frame 11. It will thus be seen that the portable grill is capable of being positioned on almost any supporting surface as it has relatively wide flat base portions lending it suitable support.

The device is easily collapsed, as illustrated in Figure 5 of the drawings, by moving the grate 27 forwardly to disengage the hooks 29 and thereby permitting the grates 27 and 28 to hang in vertical position from pivotal connections 35 and 36 located on the front frame 10 and the back frame 11, respectively. The grill 21 is lifted vertically from the assembly and may be positioned in vertical arrangement within the device by hanging it therein over one of the edges thereof or over one of the upper edges of the grates 27 and 28, if desired. The device may then be folded flatly together, as illustrated in Figure 6 of the drawings, so that the front frame 10 and the side frame 13 are on the same longitudinal plane and the back frame 11 and side panel are on the same longitudinal plane and spaced with respect to the front 10 and the side 12.

Alternately, the device may be folded as shown in Figure 5 of the drawings so that the front 10 and the side 12 lie on the same longitudinal plane while the side 13 and the back 11 lie on a similar spaced longitudinal plane. In either event the device is collapsed to a relatively thin elongated shape which may be laid flat in a storage or trunk compartment of an automobile or stood against the back of a seat thereof for easy carrying.

It will thus be seen that a portable grill has been disclosed which is formed essentially of six wire frame sections, four of which comprise the front, back and side walls, two of which are pivoted to the front and back walls and engageable with one another to form a V-shaped grate, and the sixth portion comprises the grill 21 which is positioned horizontally in the device on any of several elevations so as to provide varying spacing with respect to the fuel on the grates 27 and 28.

It will thus be seen that the several objects of the invention have been met by the portable grill disclosed herein.

Having thus described my invention, what I claim is:

1. A portable grill comprising two vertically standing side sections each having front and back corner posts and a pair of front and back frame sections each having loops on their outermost ends encircling the said corner posts of the side sections, a pair of grate sections pivoted one to the front frame section and one to the back frame section and transversely thereof and together being of a total width greater than the space between the said front and back section, hook means on the free end of one of the said grill sections for temporarily securing it to the free end of the other of the said grill sections and in angular relation thereto to form a transversely V-shaped grate, acting to hold the said side sections and front and back frame sections in rectangular relation to one another and a removable grill supported on said frame sections above said grate, and a splatter shield comprising a section of sheet metal having rods secured thereto and extending beyond the sides thereof, said rods looped about said front corner post to locate said section of sheet metal forwardly of said front section so that the same is movable vertically therealong.

2. A portable grill comprising two vertically standing side sections formed of rod-like material each having front and back corner posts and a pair of front and back rod-like frame sections each having loops on their outermost ends encircling the said corner posts of the side sections whereby the said front section may be folded flat against one of the said side sections and the back section folded flat against the other of the said side sections with the said side sections in longitudinal end to end relation with the respective front and back sections, a pair of grate sections one of which is pivoted transversely to the inner surface of the said front section and the other of which is pivoted transversely to the inner surface of the said back section, the said grates together being of a total width greater than the space between the said front and back section, hook means on the free end of one of the said grill sections for temporarily securing it to the free end of the other of the said grill section and in angular relation thereto to form a V-shaped grate between the said front and back sections, the side edges of the said grate lying adjacent the said side section and acting in assembled position to hold the said side section and the front and back sections in rectangular relation to one another and a splatter shield slidably engaging said front corner post and positioned forwardly of said front section.

JOHN W. SNYDER.

REFERENCES CITED

The following references are of record in the file of this patent:

UNITED STATES PATENTS

| Number | Name | Date |
| --- | --- | --- |
| 1,518,713 | Trow | Dec. 9, 1924 |
| 2,076,783 | Jones | Apr. 13, 1937 |
| 2,120,683 | Simmons | June 14, 1938 |
| 2,307,914 | Bitney | Jan. 12, 1943 |
| 2,511,594 | Loffredo | June 13, 1950 |
| 2,559,243 | Brown | July 3, 1951 |